No. 890,833. PATENTED JUNE 16, 1908.
W. J. ANDERSON.
STOCKING TURNING MACHINE.
APPLICATION FILED NOV. 8, 1906.
2 SHEETS—SHEET 1.
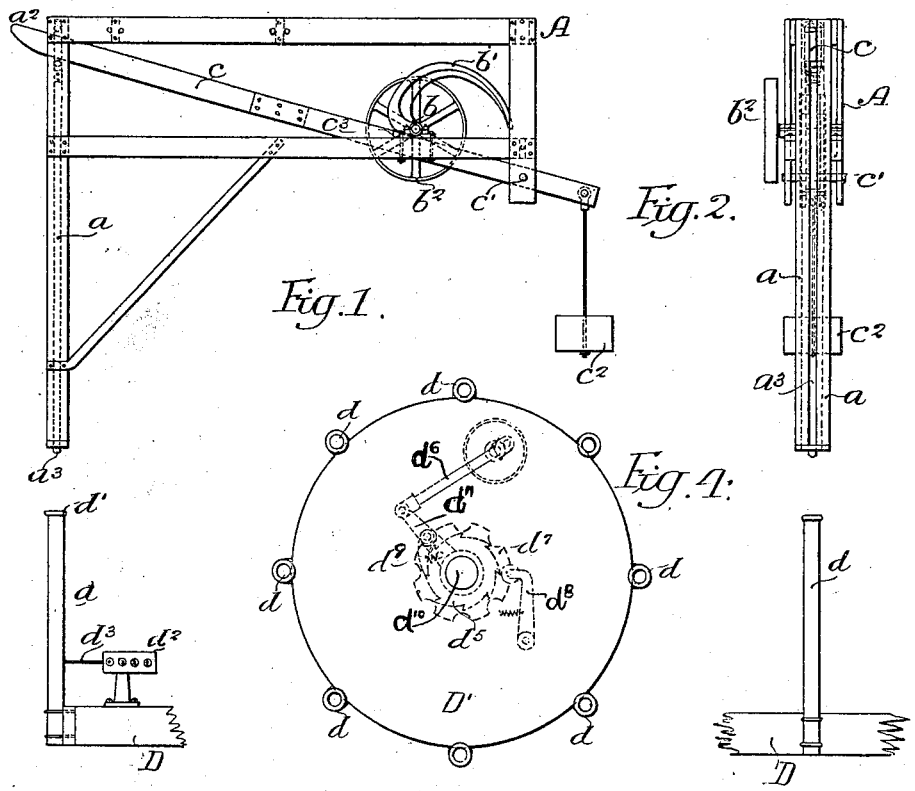
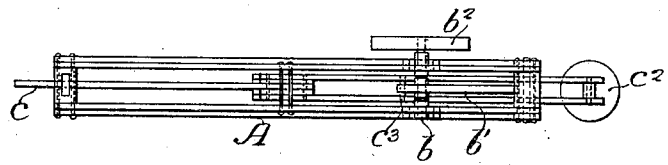
Witnesses:
Wills A. Burrowes
Titus A. Ives
Inventor
William J. Anderson.
by his Attorneys.
Howson + Howson

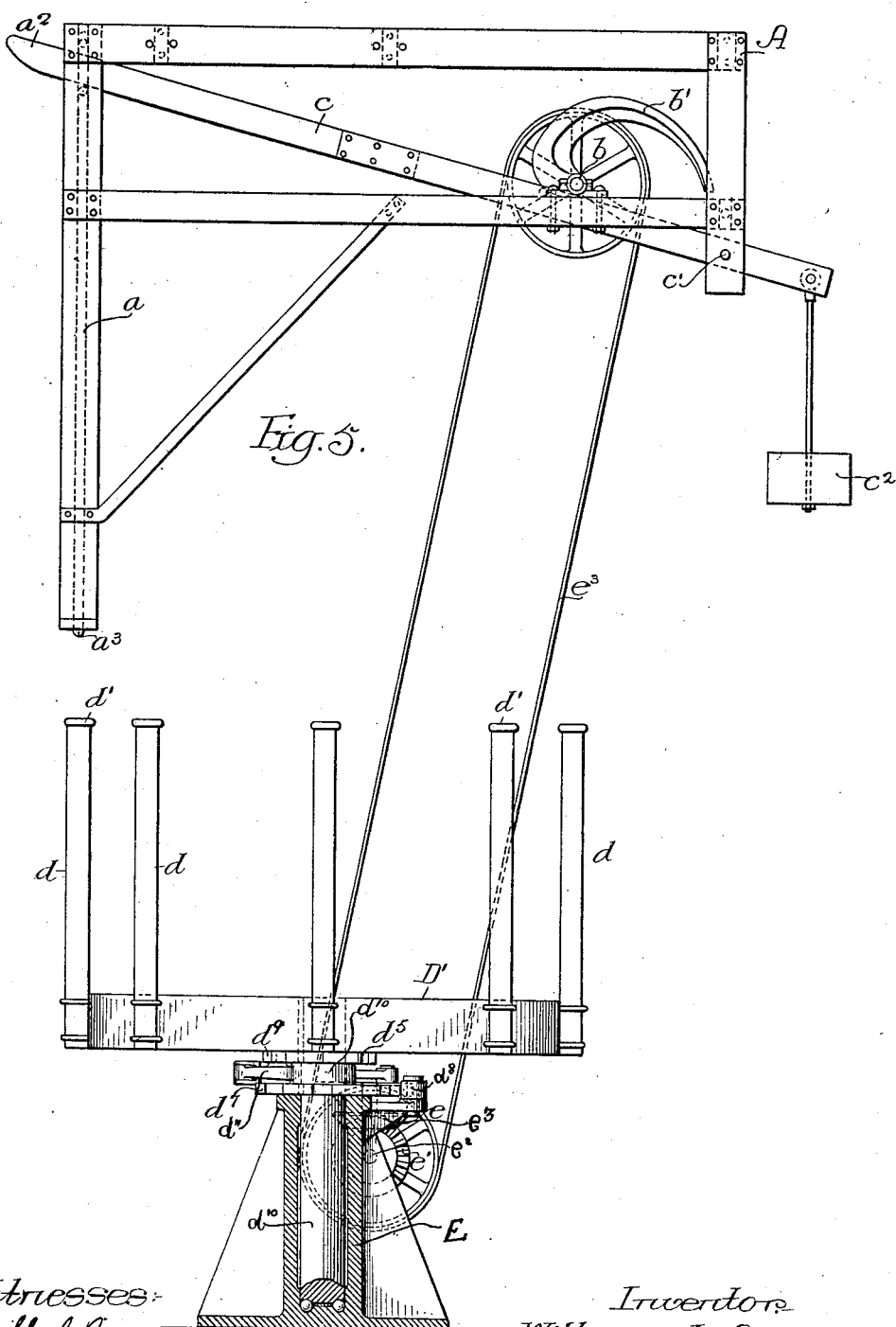

UNITED STATES PATENT OFFICE.

WILLIAM J. ANDERSON, OF PHILADELPHIA, PENNSYLVANIA.

STOCKING-TURNING MACHINE.

No. 890,833.　　　Specification of Letters Patent.　　　Patented June 16, 1908.

Application filed November 8, 1906. Serial No. 342,468.

*To all whom it may concern:*

Be it known that I, WILLIAM J. ANDERSON, a citizen of the United States, residing in Philadelphia, Pennsylvania, have invented certain Improvements in Stocking-Turning Machines, of which the following is a specification.

One object of my invention is to provide a device for turning stockings inside out more quickly than can at present be done by hand labor and it is further desired that the said device shall be of a relatively simple construction, as well as easy to operate. These objects I attain as hereinafter set forth, reference being had to the accompanying drawings, in which:

Figure 1, is a side elevation of my stocking turning machine; Fig. 2, is a front elevation; Fig. 3, is a plan of the machine shown in Fig. 1, Fig. 4, is a plan of a special form of the supporting structure on which stockings are carried before and while they are being turned, and Fig. 5, is a side elevation of the device shown in Fig. 4, there being also illustrated the plunger and operating mechanism employed in this form of my invention.

In the above drawings, A represents a framework constructed in any suitable manner to support a pair of vertical guides $a$, $a$, shaft $b$ and an oscillatory bar $c$ pivotally supported upon said frame at $c'$. The pivotal point of the bar is so placed that it has a long and a short arm, and the former of these operates between the guides $a$, while the latter has attached to its end a weight $c^2$.

Fixed transversely between two parts of the bar $c$ is a pin $c^3$ so placed as to be engaged by a cam $b'$ fixed to the shaft $b$. Said shaft is turned or may be driven by a pulley $b^2$ suitably connected in any desired manner to a source of power and the cam $b'$ is so designed that when said shaft is turned the bar $c'$ is periodically forced to turn on its pivot $c'$ from the position shown in Fig. 1; the weight $c^2$ being consequently raised. Said weight thereafter returns said bar to the above noted position as soon as this is permitted by the cam, and a stop $a^2$ is provided at the top of the guides $a$ so as to limit the upward motion of the bar $c$.

Vertically movable between the guides $a$ is a rod or plunger $a^3$, preferably circular in section and having a rather blunt or rounded end; it being attached to or hung from the end of the rod $c$ so as to be raised thereby. The connection between said bar and the rod is such as to permit the former to move through it when said rod is oscillated on its pivot.

Below and directly in the line of movement of the plunger $a^3$ is a pipe or tubular structure $d$ open at both ends and carried upon a suitable support D so that the rod $a^3$ can pass into and through it. Said pipe may be provided with a bead $d'$ at its upper end, though, if desired, it may be simply rounded or smoothed off so as to avoid possible damage to the stockings or other articles operated on.

Mounted upon the supporting structure D is any suitable form of registering instrument $d^2$, the operating arm $d^3$ of which extends toward the tubular structure $d$ so that it is necessarily moved to an extent sufficient to actuate the mechanism of said instrument by the hand of an operator as the latter places a stocking over said structure.

Under operating conditions, the shaft $b$ is continuously turned, and as a result, the cam $b'$ periodically acts on the rod $c$ so that in conjunction with the weight $c^2$, it causes the end of the bar to move up and down between the guides $a$. This action causes the rod $a^3$ to be periodically reciprocated through the tubular structure $d$, so that if, while the rod is in its elevated position, a stocking be placed over said structure, the foot of the stocking is immediately engaged by the rounded end of the rod on its next descent and forced through said structure. This action causes the stocking to be drawn through and finally delivered from the lower end of the structure $d$; the action being such that it is turned inside out as desired. In placing the stockings successively over the structure $d$, the hand of the operator naturally comes in contact with the actuating lever $d^3$ of the registering instrument $d^2$, thereby operating this so as to cause said instrument to register one unit for each stocking placed over the structure.

It is possible under operating conditions for one workman to feed at least two machines of the type described above, and inasmuch as these may be run at a relatively high speed, it will be understood that the amount of work capable of being performed is greatly in excess of what can be secured by the ordinary operation of hand turning. It will, moreover, be noted that the device whereby I accomplish this end is of the simplest mechanical construction and possesses no delicate parts liable to require attention or repair.

If desired, I may provide a plurality of tubular structures $d$ all supported upon a revoluble platform or frame D′ provided with any suitable mechanism whereby it may be periodically turned in a horizontal plane.

In that form of my device shown in Figs. 4 and 5, I provide the table or platform D′ with a vertical supporting spindle $d^{10}$, forming the latter to operate in a suitable step bearing formed in the supporting structure E. On the spindle near its upper end I fix a sprocket wheel $d^7$, having notches with which coöperates a spring pressed roller-carrying arm $d^8$ mounted upon a bracket $e^3$ projecting from the supporting structure E. There is also fixed to the spindle or to the underside of the platform D′, as desired, a ratchet wheel $d^5$ and there is coöperating with this a pawl $d^9$ carried by an arm $d^{11}$ attached to a collar journaled on the spindle $d^{10}$. The supporting structure E, or any other suitable structure, is arranged to carry a pair of intermeshing bevel gears $e$ and $e'$, of which the latter is driven from a substantially horizontal shaft $e^2$. The gear $e$ is provided with a crank pin and there is a connecting rod or link $d^6$ extending between said pin and the end of the arm $d^{11}$. The shaft $e^2$ is provided with a pulley wheel, and a belt $e^4$ connects said wheel with a second pulley wheel and the shaft $b$. The various parts are so proportioned and arranged that each revolution of the shaft $b$ causes the bevel gear $e$ to make one revolution and thereby actuates the pawl $d^9$ so that the platform or table D′ is turned to an extent equal to the space between two adjacent structures $d$. As is obvious, the spring pressed roller arm $d^8$ engages its sprocket wheel $d^7$ so that the table is held stationary when it is not being actuated by the pawl.

Under operating conditions the platform is moved in unison with the cam $b'$ so that the tubular structures $d$ are successively brought in line with the plunger $a^3$ just prior to its downward stroke. Stockings to be turned are placed over the said pipes or tubular structures before they are brought into line with the plunger, and it is obvious that with this device a much higher speed of operation is attainable than with the simpler form of my invention shown in Fig. 1, though in some cases this latter may be the more desirable form of the device.

I claim as my invention:

1. The combination of a frame, a bar pivotally supported on the frame, a guide, a plunger operative in the guide and attached to the bar, means for oscillating said bar to longitudinally move the plunger, and a tubular structure open at both ends, with means for supporting said structure in line with the plunger, substantially as described.

2. The combination of a frame, a shaft having a cam, a pivoted bar on the frame placed to be oscillated by said cam, a weight on one end of said bar, a plunger acted on by the opposite end of the bar, with means for guiding the plunger, and a tubular structure supported in the line of movement of said plunger, substantially as described.

3. The combination of a reciprocatory plunger, a rotary structure having mounted on it a series of tubes movable into line with the plunger, means for intermittently turning said structure, and means for holding it immovable after each turning impulse, substantially as described.

4. The combination of a plunger, means for reciprocating the same, a rotary structure having mounted on it a series of tubes open at both ends and movable into line with the plunger, a device for intermittently turning the said structure, and means for holding the structure immovable with one of the tubes in line with the plunger after each turning impulse, substantially as described.

In testimony whereof, I have signed my name to this specification, in the presence of two subscribing witnesses.

WILLIAM J. ANDERSON.

Witnesses:
 JENNIE W. SCOTT,
 JAMES R. ANDERSON.